United States Patent
He et al.

(10) Patent No.: US 9,584,388 B2
(45) Date of Patent: Feb. 28, 2017

(54) DOMAIN NAME SERVER TRAFFIC VOLUME ESTIMATION

(71) Applicant: EMPIRE TECHNOLOGY DEVELOPMENT LLC, Wilmington, DE (US)

(72) Inventors: Yong He, Chaoyang District (CN); Qi Li, Haidian District (CN); Xuefeng Song, Shijiazhuang (CN)

(73) Assignee: Empire Technology Development LLC, Wilmington, DE (US)

( * ) Notice: Subject to any disclaimer, the term of this patent is extended or adjusted under 35 U.S.C. 154(b) by 61 days.

(21) Appl. No.: 14/443,902

(22) PCT Filed: Apr. 3, 2014

(86) PCT No.: PCT/CN2014/074728
§ 371 (c)(1),
(2) Date: May 19, 2015

(87) PCT Pub. No.: WO2015/149327
PCT Pub. Date: Oct. 8, 2015

(65) Prior Publication Data
US 2016/0301590 A1 Oct. 13, 2016

(51) Int. Cl.
*G06F 15/173* (2006.01)
*H04L 12/26* (2006.01)
(Continued)

(52) U.S. Cl.
CPC .... *H04L 43/0876* (2013.01); *G06F 17/30554* (2013.01); *G06F 17/30867* (2013.01); *H04L 61/1511* (2013.01); *H04L 67/02* (2013.01)

(58) Field of Classification Search
USPC ....... 709/203, 217, 223, 224, 225, 226, 228, 709/232, 238; 705/14.42
See application file for complete search history.

(56) References Cited

U.S. PATENT DOCUMENTS 7,165,116 B2   1/2007   Grove et al.
7,506,047 B2 *   3/2009   Wiles, Jr. ............ G06F 11/3414
                                                    709/225

(Continued)

OTHER PUBLICATIONS

"Cloudflare," accessed at https://web.archive.org/web/20130415085523/http://blog.cloudflare.com/?tag=pageviews, accessed on Jan. 14, 2015, pp. 1-12.

(Continued)

*Primary Examiner* — Quang N Nguyen
(74) *Attorney, Agent, or Firm* — Moritt Hock & Hamroff LLP; Steven S. Rubin, Esq.

(57) ABSTRACT

Technologies are generally described for methods and systems effective to determine traffic volume of a domain name server caused by a host domain. In some examples, a host domain may store page view data that relates to page views requested at the domain name server. The host domain may receive a first query for a resource associated with the host domain. The host domain may add an instruction to the resource to produce a modified resource and send the modified resource to a device. The modified resource may generate a second query that may be used to determine traffic volume. The device may receive the modified resource, and generate the second query that includes an identification of the domain name server. The host domain may receive the second query, detect the identification, and update the page view data. The host domain may determine traffic volume based on the page view data.

13 Claims, 6 Drawing Sheets

(51) Int. Cl.
  *H04L 29/08*    (2006.01)
  *H04L 29/12*    (2006.01)
  *G06F 17/30*    (2006.01)

(56) References Cited

U.S. PATENT DOCUMENTS

| | | | |
|---|---|---|---|
| 7,792,948 B2* | 9/2010 | Zhao | H04L 41/046 709/224 |
| 7,966,398 B2* | 6/2011 | Wiles, Jr. | G06F 11/3414 709/203 |
| 8,463,877 B1 | 6/2013 | Richardson et al. | |
| 8,494,897 B1* | 7/2013 | Dawson | G06Q 10/10 705/14.42 |
| 2003/0055883 A1* | 3/2003 | Wiles, Jr. | G06F 11/3414 709/217 |
| 2006/0235972 A1 | 10/2006 | Asnis | |
| 2010/0257024 A1 | 10/2010 | Holmes et al. | |

OTHER PUBLICATIONS

"Google Analytics," accessed at https://web.archive.org/web/20140401232510/http://en.wikipedia.org/wiki/Google_Analytics, posted on Mar. 10, 2014, pp. 1-7.

"JavaScript Tracker, Parse.ly Crawler," accessed at www.parsely.com/api/tracker.html, posted on Jan. 23, 2013, pp. 1-5.

International Search Report and Written Opinion for counterpart International Patent Application No. PCT/CN2014/074728 mailed Jan. 9, 2015, 8 pages.

Wang, Y.A., et al., "Estimating the Performance of Hypothetical Cloud Service Deployments: A Measurement-Based Approach," Proceedings IEEE INFOCOMM, pp. 2372-2380 (Apr. 10-15, 2011).

* cited by examiner

DOMAIN NAME SERVER TRAFFIC VOLUME ESTIMATION

CROSS-REFERENCE TO RELATED APPLICATION

This application is the U.S. National Stage filing under 35 U.S.C. §371 of PCT Application Ser. No. PCT/CN2014/074728 filed on Apr. 3, 2014. The disclosure of the PCT Application is hereby incorporated herein by reference in its entirety.

BACKGROUND

Unless otherwise indicated herein, the materials described in this section are not prior art to the claims in this application and are not admitted to be prior art by inclusion in this section.

A content provider may use a content delivery network to alleviate traffic of an infrastructure of the content provider. The content delivery network may use a domain name system to achieve load balancing. The domain name system may include one or more domain name servers configured to resolve addresses identifying requests for content relating to the content provider.

SUMMARY

In some examples, methods for determining traffic volume of a domain name server caused by a host domain are generally described. The methods may include storing, by the host domain, in a memory, page view data that may relate to the domain name server. The methods may also include receiving, by the host domain from a device, a first query for a resource that may be associated with the host domain. The methods may also include, in response to receipt of the first query, by the host domain, adding an instruction to the resource to produce a modified resource. The modified resource may be effective to generate a second query. The methods may also include sending, by the host domain, the modified resource to the device. The methods may also include receiving, by the host domain from the device, the second query. The second query may include an identification of the domain name server. The methods may also include detecting, by the host domain, the identification in the second query. The methods may also include, in response to the detection of the identification, updating, by the host domain, the page view data. The methods may also include determining, by the host domain, the traffic volume of the domain name server caused by the host domain based on the page view data.

In some examples, methods for generating a modified query used to determine traffic volume of a domain name server are generally described. The methods may include sending, by a device, an initial query to a host domain. The initial query may be for a resource associated with the host domain. The methods may also include receiving, by a device, a modified resource from the host domain. The modified resource may include an instruction effective to generate the modified query. The methods may also include generating, by a device, the modified query based on the instruction. The modified query may include an identification of the domain name server. The methods may also include sending, by a device, the modified query to the host domain.

In some examples, systems effective to determine traffic volume of a domain name server are generally described. The systems may include a device, the domain name server, and a host domain. The domain name server may be assigned to the device based on a distance between the domain name server and the device. The host domain may include a processor and a memory. The processor and the memory may be configured to be in communication with each other. The memory may be configured to store page view data that relates to the domain name server. The device may be configured to be in communication with the domain name server and the host domain. The device may be configured to send a first query to the host domain. The first query may be for a resource associated with the host domain. The processor of the host domain may be configured to receive the first query from the device. The processor of the host domain may also be configured to, in response to receipt of the first query, add an instruction to the resource to produce a modified resource. The processor of the host domain may also be configured to send the modified resource to the device. The device may also be further configured to receive the modified resource and generate a second query based on the instruction in the modified resource. The second query may include an identification of the domain name server. The device may also be further configured to send the second query to the processor. The processor of the host domain may also be configured to receive the second query from the device. The processor of the host domain may also be configured to detect the identification in the second query. The processor of the host domain may also be configured to, in response to the detection of the identification, update the page view data that relates to the domain name server. The processor of the host domain may also be configured to determine traffic volume of the domain name server caused by the host domain based on the page view data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
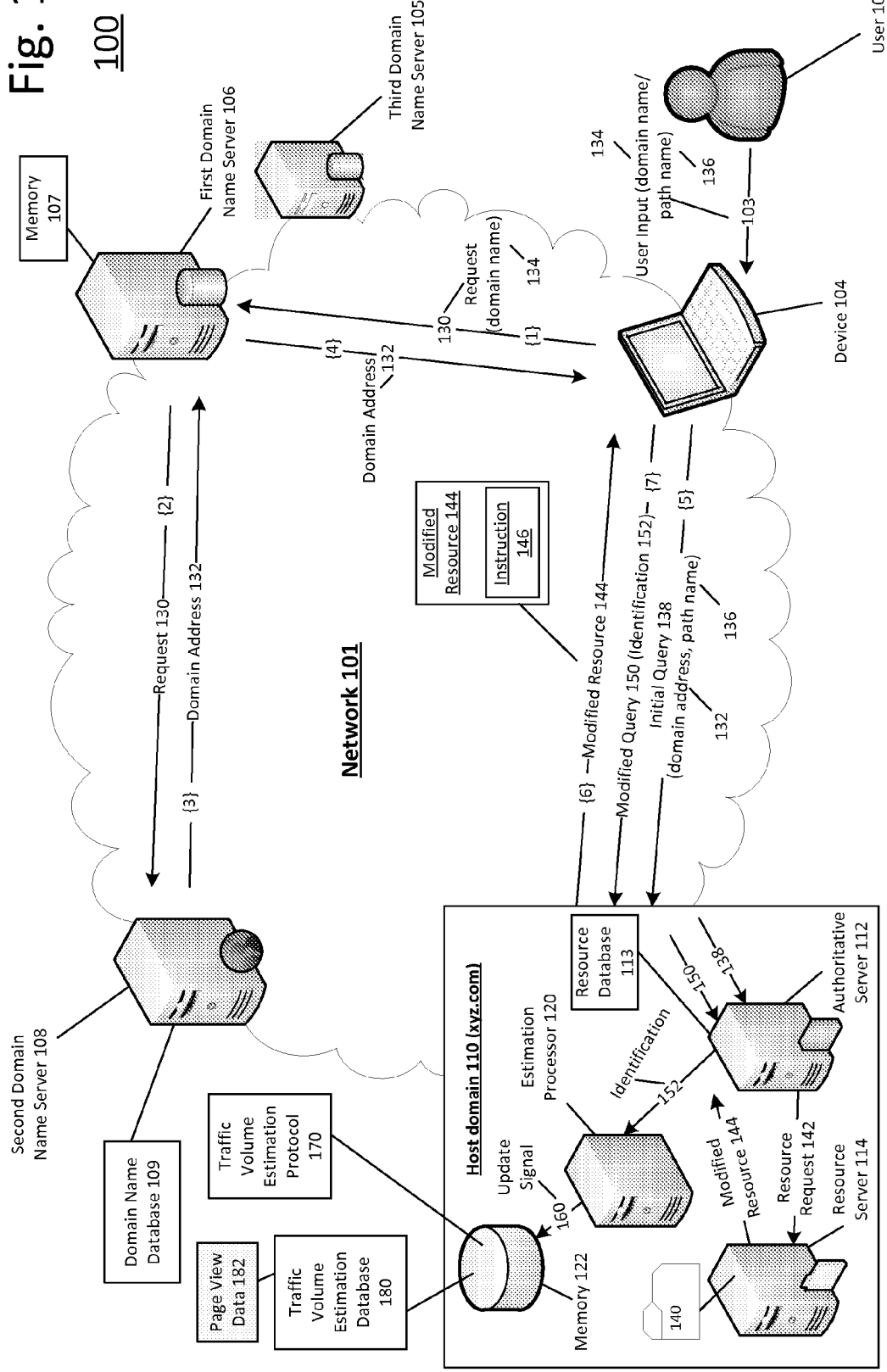
FIG. 1 illustrates an example system that can be utilized to implement domain name server traffic volume estimation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to domain name server traffic volume estimation.

Briefly stated, technologies are generally described for methods and systems effective to determine traffic volume of a domain name server caused by a host domain. In some examples, a host domain may store page view data that relates to page views requested at the domain name server. The host domain may receive a first query for a resource, such as a web page, associated with the host domain. The host domain may add an instruction to the resource to produce a modified resource and send the modified resource to a device. The modified resource may be effective to generate a second query that may be used to determine traffic volume. The device may receive the modified resource, and generate the second query that includes an identification of the domain name server. The host domain may receive the second query, detect the identification, and update the page view data. The host domain may determine traffic volume based on the page view data.

FIG. 1 illustrates an example system 100 that can be utilized to implement domain name server traffic volume estimation, arranged in accordance with at least some embodiments described herein. As depicted, system 100 may include a device 104, a first domain name server (DNS) 106, a second domain name server 108, and/or a host domain 110. First domain name server 106 may be, for example, a local domain name server of a domain name system. The domain name system may be used to resolve requests for a Uniform Resources Locator (URL) by providing internet protocol (IP) addresses in response to the URL. For example, in response to a request including the URL abc.com, the domain name system may provide the Internet Protocol (IP) address 11.12.13 associated with the host domain that hosts data at abc.com.

First domain name server 106 may be configured to be in communication with second domain name server 108 and device 104 through network 101. In examples where first domain name server 106 is a local DNS effective to cache a defined number of IP addresses, second domain name server 108 may be a global DNS that may be effective to store more IP addresses than first DNS server 106.

Network 101 may be the Internet. First domain name server 106 may include a memory 107 that may store one or more IP addresses and corresponding domain names. In some examples, first domain name server 106 may be assigned to device 104 based on a geographic location. In some examples, first domain name server 106 may be assigned to device 104 based on a distance between device 104 and first domain name server 106.

Second domain name server 108 may be, for example, a root domain name server or a global domain name server of the domain name system. Second domain name server 108 may be configured to be in communication with one or more local domain name servers such as first domain name server 106. Second domain name server 108 may be configured to be in communication with a domain name database 109. Domain name database 109 may include domain addresses and corresponding domain names of one or more host domains.

In some examples, system 100 may further include at least a third domain name server 105. Third domain name server 105 may be, for example, a local domain name server similar to first domain name server 106. Third domain name server 105 may be provide IP addresses for a region different than a region served by first domain name server 106.

Host domain 110 may include one or more servers that may store resources such as a resource 140. Resource 140 may be a webpage or a file relating to a website. In the example, the website has the URL "xyz.com". Resource 140 may be data associated with webpages and/or files of host domain 110. For example, resource 140 may be a code file of a webpage, video, photo, or some other resource associated with host domain 110. Host domain 110 may include an authoritative server 112, at least one resource server such as a resource server 114, an estimation processor 120, and/or a memory 122. Estimation processor 120 may be configured to estimate a traffic volume of a domain name server caused by host domain 110—as is explained in more detail below. Estimation processor 120 may be configured to be in communication with authoritative server 112 and/or memory 122. Authoritative server 112 may be configured to resolve a path name such as by providing an IP address for a received path name—as is explained in more detail below.

Authoritative server 112 may be configured to be in communication with resource server 114. Resource server 114 may store resource 140. Authoritative server 112 may include a resource database 113. Resource database 113 may store a directory that may map path names and/or resources to a corresponding resource server. For example, a directory in resource database 113 may indicate that resource 140 is stored in resource server 114. Data in resource database 113 may also be effective to map path names with corresponding resources associated with host domain 110. Resource database 113 may further include addresses of resource servers of host domain 110.

Memory 122 may store a traffic volume estimation protocol 170 and/or a traffic volume estimation database 180. Traffic volume estimation protocol 170 may include instructions effective to estimate traffic volume of one or more domain name servers such as first domain name server 106 and third domain name server 105. Traffic volume estimation database 180 may store page view data that corresponds to one or more domain name servers. For example, page view data 182, stored in traffic volume estimation database 180, may identify a number of times first domain name server 106 facilitated access to a resource associated with host domain 110. Traffic volume estimation database 180 may further store data resulting from execution of instructions in traffic volume estimation protocol 170.

Device 104 may be configured to receive a user input 103 from, for example, a user 102. In some examples, instead of receiving user input 103 from user 102, device 104 may receive an input from an application program being executed by host domain 110. In an example, user input 103 may be a uniform resource locator ("URL") of resource 140. User input 103 may include a domain name 134 and a path name 136 (e.g. xyz.com/photos). In the example, domain name 134 may be "xyz.com" and path name 136 may be "photos". In response to receiving user input 103, device 104 may generate a request 130. Request 130 may be a request for an IP address of domain name 134. In the example, request 130 may be a request for the IP address of domain name "xyz.com". Request 130 may include an indication of domain name 134.

Device 104 may send request 130 to first domain name server 106 (depicted as operation {1}). First domain name server 106 may receive request 130 and, in response, may search for domain name 134 in memory 107. If first domain name server 106 detects a presence of domain name 134 in memory 107, first domain name server 106 may retrieve a domain address 132 from memory 107. Domain address 132 may be an IP address of domain name 134 (e.g. "11.12.13"). First domain name server 106 may send domain address 132 to device 104 (depicted as operation {4}).

If first domain name server 106 detects an absence of domain name 134 in memory 107, first domain name server 106 may forward request 130 to second domain name server 108 (depicted as operation {2}). Second domain name server 108 may receive request 130 and, in response, may search for domain name 134 in domain name database 109. Second domain name server 108 may detect a presence of the domain name 134 in domain name database 109. Second domain name server 108 may retrieve domain address 132 from domain name database 109 and send address 132 to first domain name server 106 (depicted as operation {3}). First domain name server 106 may forward address 132 to device 104 (depicted as operation {4}) in response to receipt of domain address 132 from second domain name server 108. In some examples, first domain name server 106 may store domain address 132 in memory 107 in response to receiving domain address 132 from second domain name server 108.

Device 104 may receive domain address 132. In response to receiving domain address 132, device 104 may send an initial query 138 to host domain 110 at domain address 132 (depicted as operation {5}). Initial query 138 may include domain address 132 and path name 136 (e.g. 11.12.13/photos). Initial query 138 may be received at authoritative server 112. In some examples, initial query 138 may be received at a communication device such as a gateway and/or router of host domain 110 and then sent to authoritative server 112. Authoritative server 112 may be configured to analyze initial query 138 and, in response to initial query 138, may be configured to determine a resource identified by path name 136. For example, authoritative server 112 may determine that resource 140 is identified by path name 136 such as by analyzing data in resource database 113. Authoritative server 112 may further be configured to search for an IP address of a resource server associated with resource 140 in response to the determination that path name 136 identifies resource 140. In the example, authoritative server 112 may retrieve an address of resource server 114 from resource database 113. In response to retrieving the address of resource server 114, authoritative server 112 may send a resource request 142 to resource server 114 to request resource 140.

Resource server 114 may receive resource request 142 and may add an instruction 146 to resource 140 to produce a modified resource 144. Resource server 114 may send modified resource 144 to device 104 (depicted as operation {6}). In some examples, instruction 146 may be a JAVASCRIPT program embedded in resource 140 and may be effective to generate a modified query 150. Device 104 may receive modified resource 144 and may execute instruction 146 to generate modified query 150 (described below). Modified query 150 may include identification 152 that may be an identification of a domain name server. In the example, identification 152 may be an identification of first domain name server 106. Device 104 may send modified query 150 to host domain 110 (depicted as operation {7}).

As will be explained in more detail below, authoritative server 112 may receive and analyze modified query 150. Authoritative server 112 may detect a presence of identification 152 identifying a domain name server in modified query 150. In response to the detection of identification 152, authoritative server 112 may send identification 152 to estimation processor 120. Estimation processor 120 may receive identification 152 and may generate an update signal 160 to modify and/or update page view data 182 that relates to first domain name server 106. Estimation processor 120 may further retrieve instructions from traffic volume estimation protocol 170 to estimate a traffic volume of first domain name server 106 based on the page view data 182 stored in traffic volume estimation database 180.

Figure 2:
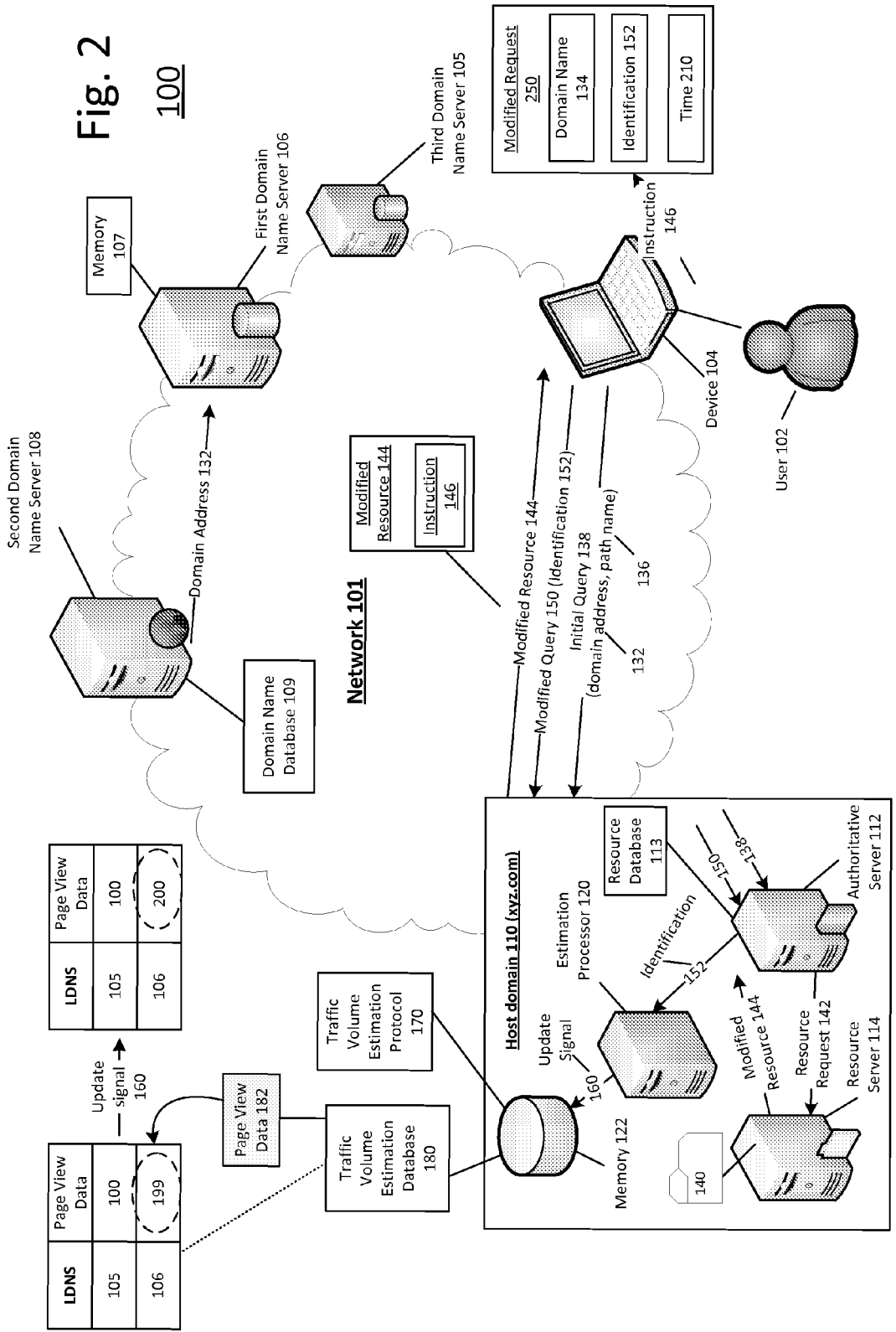
FIG. 2 illustrates the example system of FIG. 1 with additional detail relating to updating a traffic volume estimation database.

FIG. 2 illustrates the example system of FIG. 1 with additional detail relating to updating a traffic estimation database, arranged in accordance with at least some embodiments described herein. FIG. 2 is substantially similar to system 100 of FIG. 1, with additional details. Those components in FIG. 2 that are labeled identically to components of FIG. 1 will not be described again for the purposes of clarity.

As mentioned above, after receiving initial query 138 from device 104, authoritative server 112 may send resource request 142 to resource server 114 to request resource 140. Resource server 114 may receive resource request 142 and may add instruction 146 to resource 140 to produce modified resource 144. Resource server 114 may send modified resource 144 to device. Device 104 may receive modified resource 144 and may execute instruction 146 to generate a modified request 250.

Modified request 250 may include domain name 134, identification 152 that identifies a DNS, and a time 210. Time 210 may be a generation time of modified request 250. For example, if modified request 250 is generated at a time of 1:30 PM, time 210 may be "1330". By including time 210 in modified request 250, queries sent from device 104 to host domain 110 may be treated individually so that page view data may be updated when queries are received at host domain 110 (described below).

In one example, modified request 250 may have the format

"123456789.1dns.abc.com" where:

"123456789" may be time 210;

"ldns" may be identification 152 that identifies first domain name server 106; and "abc.com" may correspond to domain name 134 of host domain 110.

In an example, initial query 138 may be "xyz.com/photos" and modified request 250 may be "1330.ldns106.xyz.com". In the example, "1330" in modified request 250 may be an indication of time 210 when modified request 250 is generated and may represent a time of 1:30 PM. In some examples, time 210 may include digits sufficient to represent time and a date. Continuing the example, "ldns106" in modified request 250 may be identification 152 that is effective to identify first domain name server 106. In operation, after modified request 250 is generated, device 104 may attempt to resolve modified request 250 by first searching in a memory, such as a cache, of device 104 to locate a resource corresponding to modified request 250. As modified request 250 changes with time, in part because modified request 250 includes time 210, device 104 may determine that the memory of device 104 does not include a resource corresponding to modified request 250. Device 104 may send modified request 250 to first DNS 106 requesting that first DNS 106 resolve modified request 250. Again, as modified request 250 changes with time, first DNS 106 may determine that first DNS 106 cannot resolve modified request 250 and may send modified request 250 to second DNS 108. Second DNS 108 may partially resolve modified request 250 and provide domain address 132 for domain name 134. Device 104 may thereafter generate modified query 150 which includes domain address 132 of host domain 110. Modified query 150 may include time 210, identification 152 and domain address 132.

Authoritative server 112 may receive and analyze modified query 150. Authoritative server 112 may detect time 210 and may send identification 152 to estimation processor 120. Estimation processor 120 may receive identification 152 from estimation processor 120 and may generate update signal 160. Update signal 160 may be effective to increment data corresponding to page view data 182 in traffic volume estimation database 180. In the example, estimation processor 120 may generate update signal 160 and may include an indication of identification 152 in signal 160 in order to increment page view data 182. As depicted in the example, signal 160 may be effective to increment page view data 182 from a value of "199" to a value of "200".

In some examples, page view data 182 may correspond to traffic volume of first DNS 106 caused by host domain 110 within a time period. Estimation processor 120 may be configured to reset page view data 182 stored in traffic volume estimation database 180 after the time has passed—in an example, five minutes.

Figure 3:
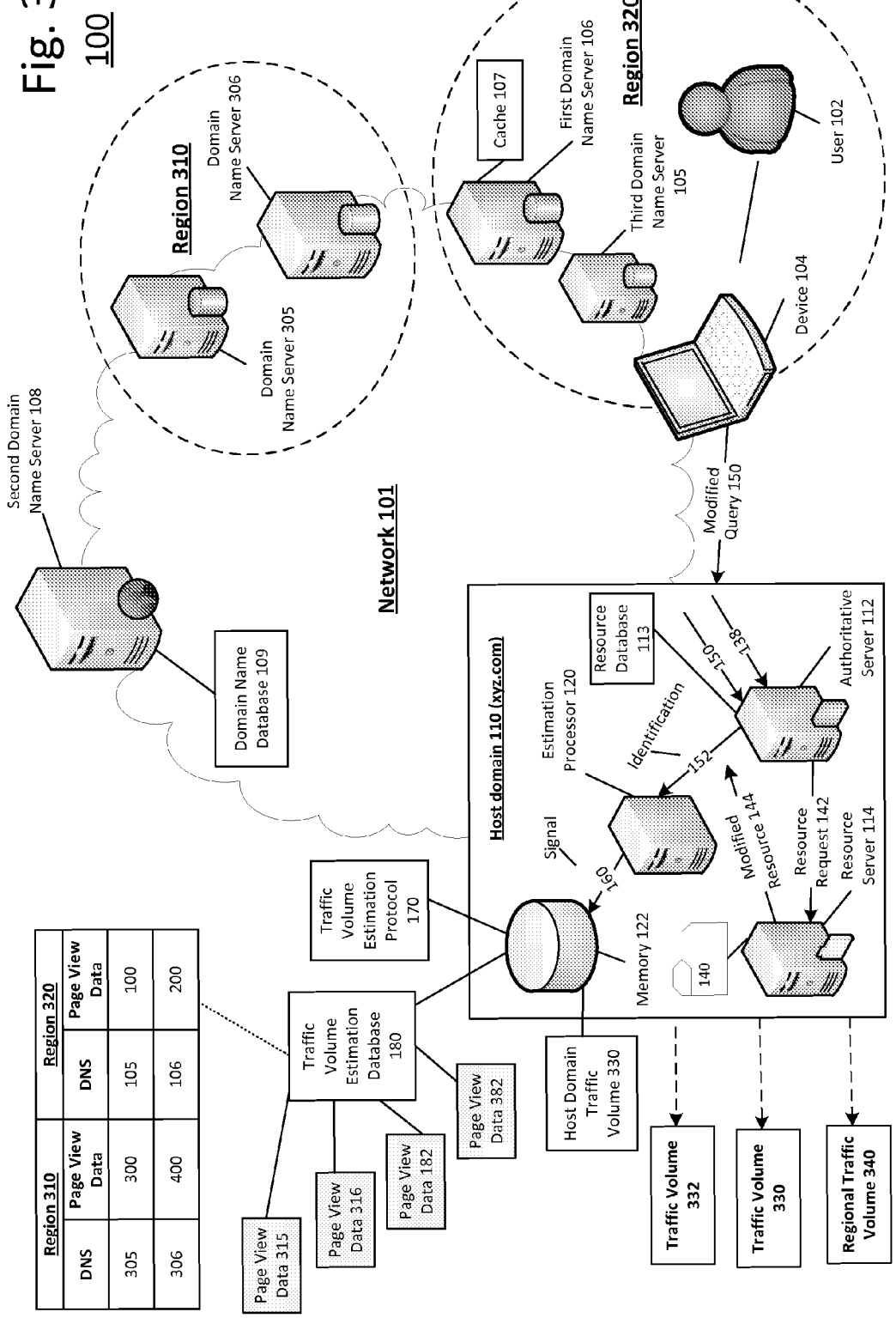
FIG. 3 illustrates the example system of FIG. 1 with additional detail relating to traffic volume estimation based on regions.

FIG. 3 illustrates the example system of FIG. 1 with additional detail relating to traffic volume estimation based on regions, arranged in accordance with at least some embodiments described herein. FIG. 3 is substantially similar to system 100 of FIG. 1, with additional details. Those components in FIG. 3 that are labeled identically to components of FIG. 1 will not be described again for the purposes of clarity.

System 100 may include domain name servers in one or more regions 310, 320. Regions 310, 320 may be defined by, for example a geographic area. In the example, region 310 includes DNS 305 and DNS 306 and region 320 includes first DNS 106 and third DNS 105. In an example, estimation processor 120 may determine traffic volume 330 and/or traffic volume 332 based on page view data 182, 382, 315, 316, and based on host domain traffic volume 330. Page view data 382 may correspond to a number of times third DNS 105 facilitated access to a resource associated with host domain 110. Page view data 315 may correspond to a number of times DNS 305 facilitated access to a resource associated with host domain 110. Page view data 316 may correspond to a number of times DNS 306 facilitated access to a resource associated with host domain 110. Host domain traffic volume 330 may be traffic volume that corresponds to a total traffic volume of host domain 110. Host domain traffic volume 330 may be stored in memory 122.

In the example, page view data 182, corresponding to first DNS 106, may be a value of "200"; page view data 382, corresponding to third DNS 105, may be a value of "100"; page view data 315, corresponding to DNS 305, may be a value of "300"; page view data 316, corresponding to DNS 306, may be a value of "400"; and host domain traffic volume 330 may be "10 gigabytes". Estimation processor 120 may determine a traffic volume for a particular DNS as being equal to the page views for the particular DNS multiplied by the traffic volume for the web site and divided by the total number of DNS requests from users.

Estimation processor 120 may first determine a sum of page view data 182, 382, 315, 316. In the example, the sum of page view data 182, 382, 315, 316 is "1000". Estimation processor 120 may then determine a ratio that corresponds to each domain name server. For example, estimation processor 120 may determine a ratio that corresponds to first domain name server 106 such as by dividing page view data 182 ("200") by the sum of page view data 182, 282, 315, 316 ("1000") to obtain "0.2". Estimation processor 120 may determine traffic volume 330 such as by multiplying the ratio "0.2" with host domain traffic volume 330 ("10 gigabytes") to obtain "2 gigabytes". When traffic volume 330 is "2 gigabytes", traffic volume 330 may indicate that first domain name server 106 may correspond to 20 percent of host domain traffic volume 330. Estimation processor 120 may determine traffic volume 332 for third domain name server 105. In the example, traffic volume 332 may be "1 gigabyte".

In another example, estimation processor 120 may further determine regional traffic volume 340 based on traffic volume 330 and traffic volume 332. Regional traffic volume 340 may correspond to a region 320. Region 320 may be a geographical region including first domain name server 106 and third domain name server 105. In some examples, region 310 and region 320 may overlap with each other. In examples where region 310 and region 320 overlap with each other, one or more domain name servers may be located in region 310 and region 320. In some examples, region 310 and region 320 may not overlap each other.

In the example, after determination of traffic volume of domain name servers in region 320, estimation processor 120 may determine regional traffic volume 340 of region 320. In the example, traffic volume 330 may be "2 gigabytes" and traffic volume 332 may be "1 gigabyte". Estimation processor 120 may sum traffic volume 330, 332 to obtain regional traffic volume 340 ("3 gigabytes"). In some examples, estimation processor 120 may also determine a regional ratio that corresponds to region 310. For example, estimation processor 120 may determine a regional ratio "0.3" indicating that region 320 may correspond to 30 percent of host domain traffic volume 330.

Among other possible benefits, a system in accordance with the disclosure may benefit users and owners of websites. Owners of a website may analyze the determined traffic volume to identify domain name servers and/or geographic areas that include more visitors to the website and may make marketing decisions based on the analysis. Administrators of networks may analyze the determined traffic volume to perform load balancing such as adjusting domain name server assignments. Users of websites may benefit from an improved performance and speed of web content delivery as a result of the system.

Figure 4:
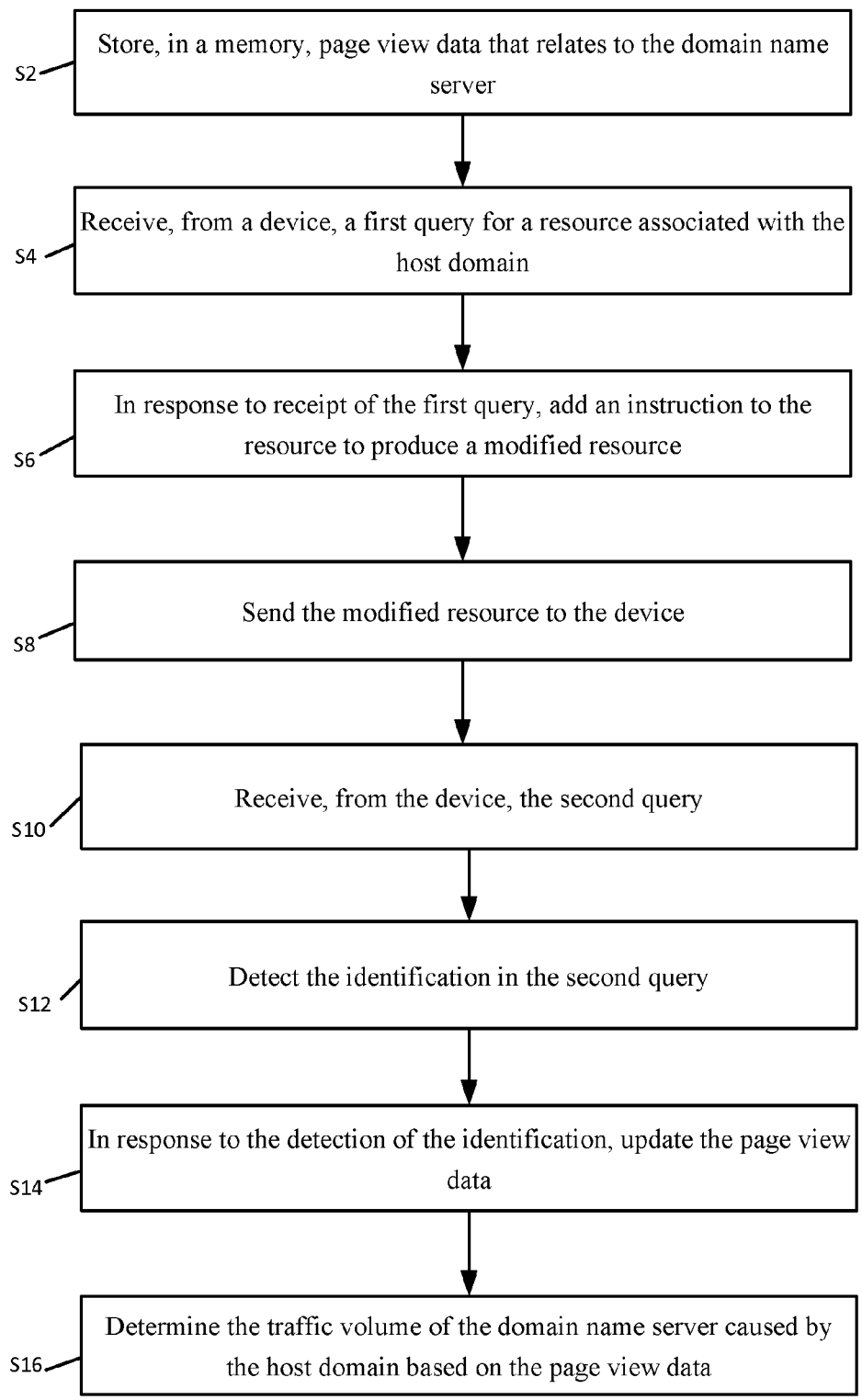
FIG. 4 illustrates a flow diagram for an example process for implementing domain name server traffic volume estimation.

FIG. 4 illustrates a flow diagram for an example process for implementing domain name server traffic volume estimation, arranged in accordance with at least some embodiments presented herein. The process in FIG. 4 could be implemented using, for example, system 100 discussed above. An example process may include one or more operations, actions, or functions as illustrated by one or more of blocks S2, S4, S6, S8, S10, S12, S14, and/or S16. Although illustrated as discrete blocks, various blocks may be divided into additional blocks, combined into fewer blocks, or eliminated, depending on the desired implementation.

Processing may begin at block S2, "Store, in a memory, page view data that relates to the domain name server". At block S2, a host domain may store page view data in a memory. The page view data may relate to a traffic volume of a domain name server caused by the host domain. The memory may be associated with the host domain. In some examples, the page view data may correspond to page view data within a time period.

Processing may continue from block S2 to block S4, "Receive, from a device, a first query for a resource associated with the host domain". At block S4, the host domain may receive a first query from a device. The device may be configured to be in communication with the domain name server and the host domain. The domain name server may be assigned to the device based on a distance between the domain name server and the device. The first query may be a query for a resource associated with the host domain. The resource may be a webpage associated with the host domain.

Processing may continue from block S4 to block S6, "In response to receipt of the first query, add an instruction to the resource to produce a modified resource". At block S6, in response to the receipt of the first query, the host domain may add an instruction to the resource to produce a modified resource. The modified resource may be effective to generate a second query. In some examples, the instruction may be a JAVASCRIPT program and may be effective to generate the second query.

Processing may continue from block S6 to block S8, "Send the modified resource to the device". At block S8, the host domain may send the modified resource to the device.

Processing may continue from block S8 to block S10, "Receive, from the device, the second query". At block S10, the host domain may receive the second query from the device. The second query may include an identification of the domain name server. The second query may further include an indication of a time that that the second query is generated.

Processing may continue from block S10 to block S12, "Detect the identification in the second query". At block S12, the host domain may detect the identification in the second query.

Processing may continue from block S12 to block S14, "In response to the detection of the identification, update the page view data". At block S14, in response to the detection of the identification, the host domain may update the page view data.

Processing may continue from block S14 to block S16, "Determine the traffic volume of the domain name server caused by the host domain based on the page view data". At block S16, the host domain may determine the traffic volume of the domain name server caused by the host domain based on the page view data. In some examples, the host domain may further determine a regional traffic volume based on the first traffic volume and the second traffic volume.

Figure 5:
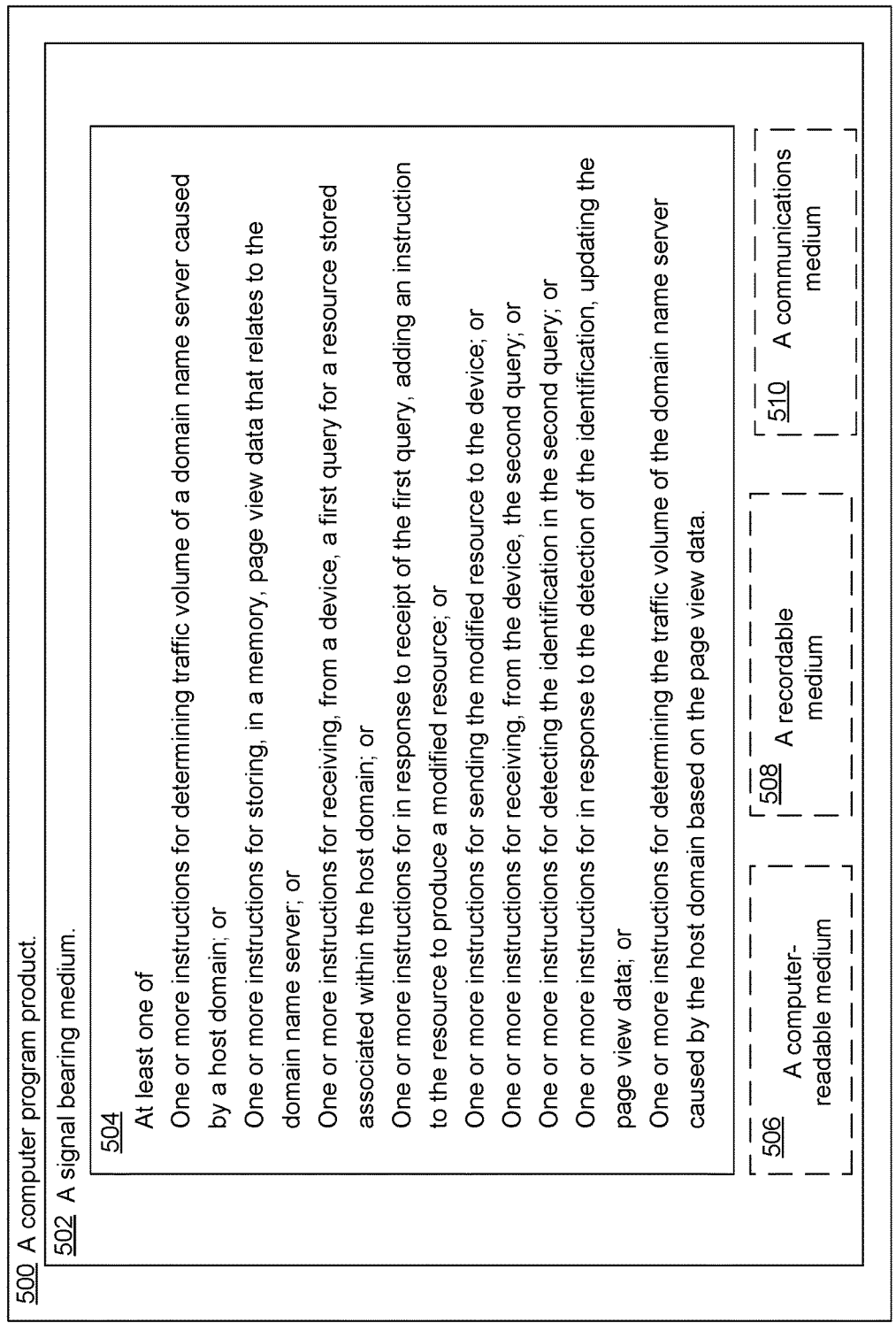
FIG. 5 illustrates an example computer program product that can be utilized to implement domain name server traffic volume estimation.

FIG. 5 illustrates an example computer program product 500 that can be utilized to implement domain name server traffic volume estimation, arranged in accordance with at least some embodiments described herein. Computer program product 500 may include a signal bearing medium 502. Signal bearing medium 502 may include one or more instructions 504 that, when executed by, for example, a processor, may provide the functionality described above with respect to FIGS. 1-4. Thus, for example, referring to system 100, estimation processor 120 may undertake one or more of the blocks shown in FIG. 4 in response to instructions 504 conveyed to the system 100 by signal bearing medium 502.

In some implementations, signal bearing medium 502 may encompass a computer-readable medium 506, such as, but not limited to, a hard disk drive, a Compact Disc (CD), a Digital Video Disk (DVD), a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, computer program product 500 may be conveyed to one or more modules of the system 100 by an RF signal bearing medium 502, where the signal bearing medium 502 is conveyed by a wireless communications medium 510 (e.g., a wireless communications medium conforming with the IEEE 802.11 standard).

Figure 6:
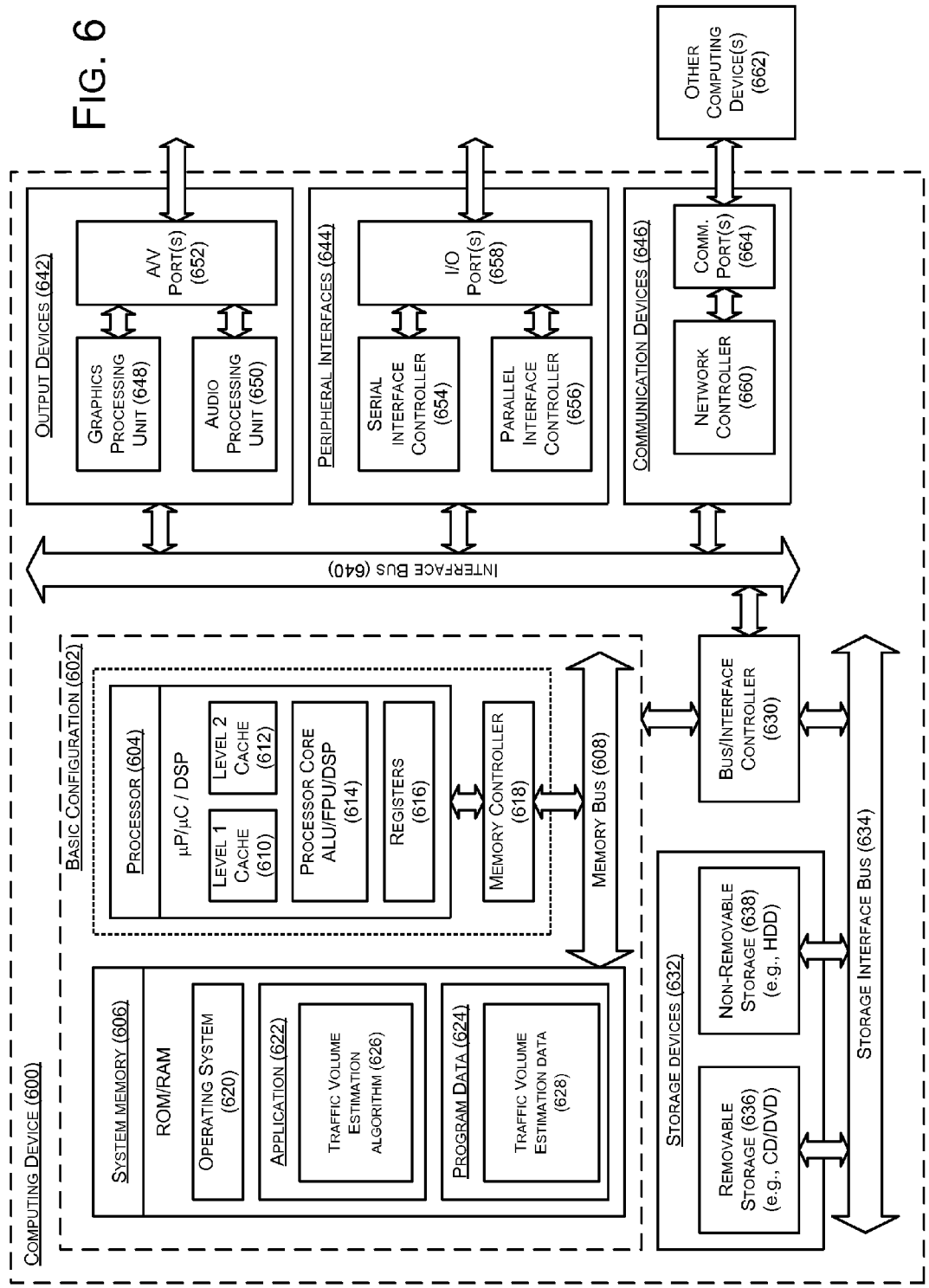
FIG. 6 is a block diagram illustrating an example computing device that is arranged to implement domain name server traffic volume estimation; all arranged according to at least some embodiments described herein.

FIG. 6 is a block diagram illustrating an example computing device 600 that is arranged to implement domain name server traffic volume estimation, arranged in accordance with at least some embodiments described herein. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include a traffic volume estimation algorithm 626 that is arranged to perform the functions as described herein including those described with respect to system 100 of FIGS. 1-5. Program data 624 may include traffic volume estimation data 628 that may be useful for implementation of domain name server traffic volume estimation as is described herein. In some embodiments, application 622 may be arranged to operate with program data 624 on operating system 620 such that implementations of domain name server traffic volume estimation may be provided. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will also be understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to determine traffic volume of a domain name server caused by a host domain, the method comprising:
   storing, in a memory, page view data that relates to the domain name server;
   receiving, from a device, a first query for a resource associated with the host domain;
   in response to receipt of the first query, adding an instruction to the resource to produce a modified resource, the modified resource being effective to generate a second query;
   sending the modified resource to the device;
   receiving, from the device, the second query, where the second query includes an identification of the domain name server;
   detecting the identification in the second query;
   in response to the detection of the identification, updating the page view data; and
   determining the traffic volume of the domain name server caused by the host domain based on the page view data;
   wherein the page view data corresponds to page view data within a time period, and the method further comprises, by the host domain, resetting the page view data after the time period has passed.

2. The method of claim 1, wherein the instruction is effective to generate the second query.

3. The method of claim 1, wherein the second query includes an indication of a time that the second query is generated.

4. The method of claim 1, wherein the resource is a webpage.

5. The method of claim 1, wherein the instruction is a JAVASCRIPT program.

6. The method of claim 1, wherein the domain name server is assigned to the device based on a distance between the domain name server and the device.

7. The method of claim 1, wherein:
   the domain name server is a first domain name server;
   the traffic volume is a first traffic volume; the page view data is first page view data; and
   determining the first traffic volume further comprises:
      retrieving second page view data from the memory, where the second page view data relates to a second domain name server;
      retrieving a second traffic volume from the memory, where the second traffic volume relates to a total traffic volume of the host domain; and
      determining the first traffic volume is based on the second page view data and the second traffic volume.

8. The method of claim 1, wherein:
   the domain name server is a first domain name server of a region;
   the traffic volume is a first traffic volume; the page view data is first page view data; and
   the method further comprises determining a second traffic volume of a second domain name server in the region based on second page view data that relates to the second domain name server.

9. A system effective to determine traffic volume of a domain name server, the system comprising:
   a device;
   the domain name server, wherein the domain name server is assigned to the device based on a distance between the domain name server and the device;
   a host domain including a processor and a memory, the processor and the memory being configured to be in communication with each other, the memory being configured to store page view data that relates to the domain name server;
   wherein the device is configured to be in communication with the domain name server and the host domain, and the device is configured to send a first query to the host domain, wherein the first query is for a resource associated with the host domain;
   the processor of the host domain is configured to:
      receive the first query from the device;
      in response to receipt of the first query, add an instruction to the resource to produce a modified resource; and
      send the modified resource to the device;
   the device is further configured to:
      receive the modified resource;
      generate a second query based on the instruction in the modified resource, where the second query includes an identification of the domain name server; and
      send the second query to the processor;
   the processor of the host domain is further configured to:
      receive the second query from the device;
      detect the identification in the second query;

in response to the detection of the identification, update the page view data that relates to the domain name server; and determine traffic volume of the domain name server caused by the host domain based on the page view data;

wherein the page view data corresponds to page view data within a time period, the processor is further effective to reset the page view data after the time period has passed.

10. The system of claim 9, wherein the second query includes the identification and an indication of a when the modified query is generated.

11. The system of claim 9, wherein the instruction is a JAVASCRIPT program.

12. The system of claim 9, wherein the resource is a webpage.

13. The system of claim 9, wherein:

the domain name server and the device are disposed in a region;

the domain name server is a first domain name server;

the system further comprises a second domain name server; and the processor is further effective to:

determine a second traffic volume that relates to the second domain name server; and determine a regional traffic volume based on the first traffic volume and the second traffic volume.

\* \* \* \* \*